United States Patent [19]

Uhlinger et al.

[11] 4,051,648
[45] Oct. 4, 1977

[54] ENGINE SHROUD FOR ROTARY LAWN MOWER

[75] Inventors: Charles E. Uhlinger, Des Moines; Clair D. Splittstoesser, Ankeny, both of Iowa

[73] Assignee: AMF Incorporated, White Plains, N.Y.

[21] Appl. No.: 684,387

[22] Filed: May 7, 1976

[51] Int. Cl.² .................................. A01D 55/18
[52] U.S. Cl. .................................. 56/255; 56/17.5
[58] Field of Search ............ 56/17.5, 320.1, 320.2, 56/255, 11.8

[56] References Cited

U.S. PATENT DOCUMENTS

| | | | |
|---|---|---|---|
| 3,802,170 | 4/1974 | Seifert et al. | 56/11.8 |
| 3,925,972 | 12/1975 | Andersson | 56/320.2 |

*Primary Examiner*—Russell R. Kinsey
*Attorney, Agent, or Firm*—George W. Price; Walter Lewis

[57] ABSTRACT

In a rotary lawn mower the engine on the deck is completely shielded by an engine shroud, and the engine exhaust is below the mower deck.

1 Claim, 6 Drawing Figures

ENGINE SHROUD FOR ROTARY LAWN MOWER

This invention relates to lawn mower noise reduction, and more particularly, to means for reducing the noise in a rotary lawn mower having an engine on the deck thereof.

Figure 1:
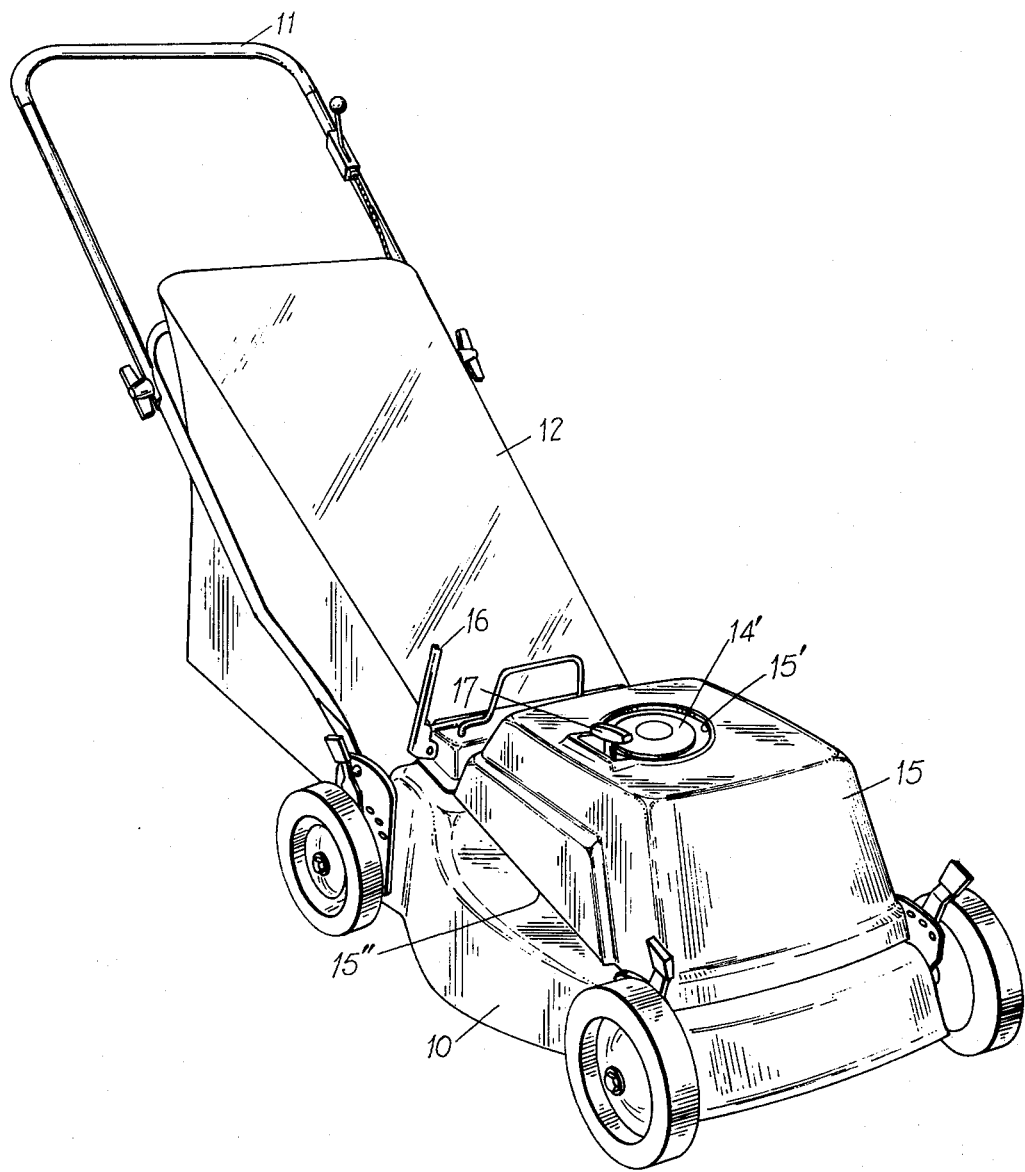
Figure 2:
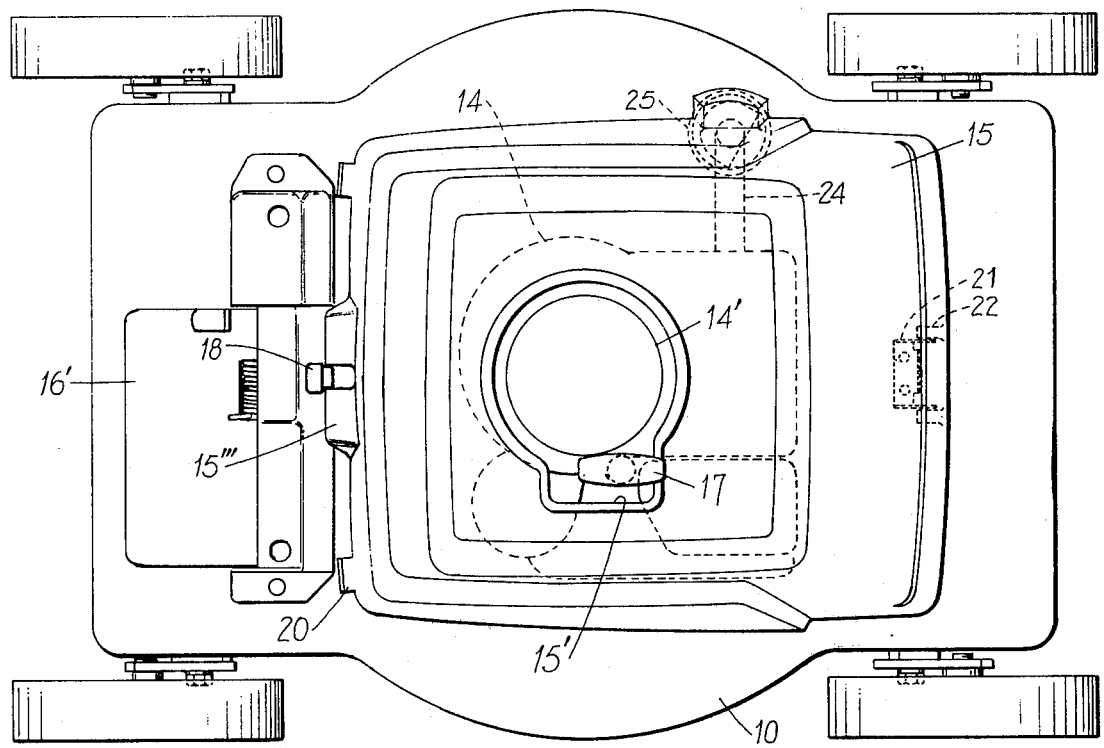
Figure 3:
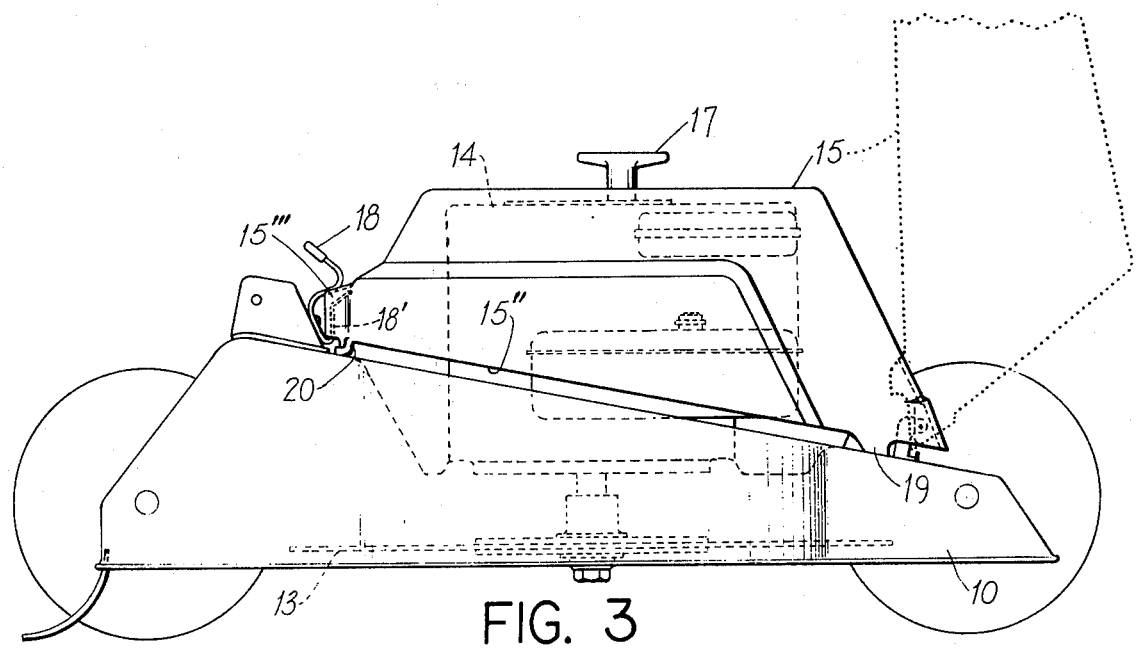
Figure 4:
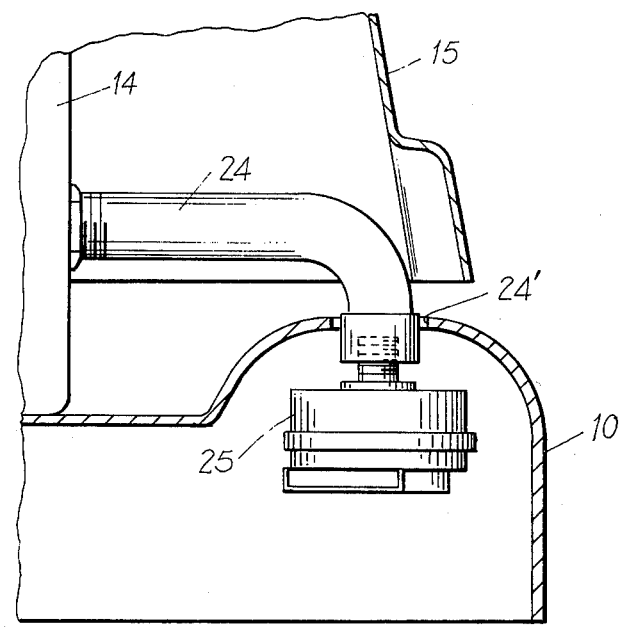
Figure 5:
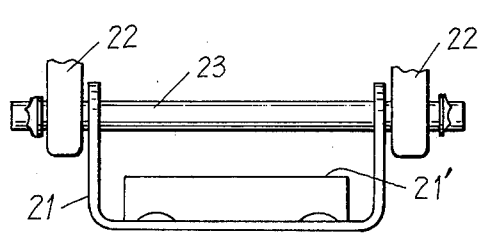
Figure 6:
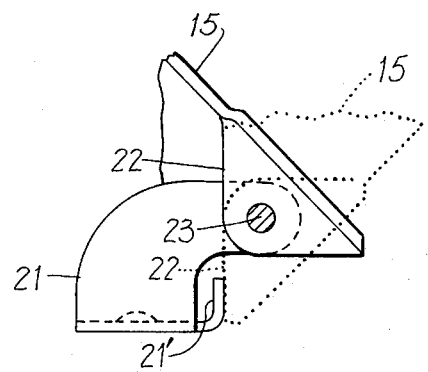

The invention will be best understood by considering one embodiment thereof taken in connection with the accompanying three sheets of drawings in which FIG. 1 is a perspective view of a rotary rear bagging lawn mower incorporating the invention; FIG. 2 is a partial top plan view of the mower; FIG. 3 is a side elevation view; FIG. 4 is an enlarged broken away view of a portion of the mower showing the below mower deck engine exhaust; FIG. 5 is an enlarged showing of the front hinge for the engine shroud; and FIG. 6 is another view of the hinge.

Referring now particularly first to FIG. 1 for an overall view of the mower, the mower comprises a wheeled deck 10, a rear handle 11, a rear grass catcher 12, a grass cutting blade 13 below the deck and an engine 14 (see also FIGS. 2 and 3) on the deck for driving the blade, and an engine shroud 15 completely shielding the engine.

A safety handle 16 is provided for operating a rear discharge door 16' (see FIG. 2) and locking the grass catcher in grass catching position and turning off the engine should one attempt to open the door 16' when the grass catcher is not on the mower in grass catching position. These features are the subject matter of copending Ser. No. 684,387, and the visual styling of the engine shroud is the subject matter of Design Ser. No. 684,389, both filed on the same date as the instant application.

The shroud 15 completely shields or encloses the engine 14 except in a minor sense, to wit, the top opening 15' and the bottom marginal opening 15". The top opening 15' is sort of keyhole-shaped to provide an air entrance for the mower air intake 14' as well as access to the engine start pull cord handle 17. The marginal space 15" which extends all around the mower is to provide a supplementary air entrance for purposes of helping to cool the engine.

The shroud 15 is hinged at its front end (see FIGS. 5 and 6) and latched closed at its back end by a latching finger 18 that operates on a latching enlargement 15''' that is integrally formed on the rear of the shroud. Actually, there are two integral latch fingers, the top one 18 and a bottom one 18'. Preferably the shroud is a one piece molded plastic member. Since the shroud can be hinged open, the engine 14 is readily accessible for service, repair, adjustment, and the like.

By referring to FIGS. 2 and 3 it will be seen that the shroud 15 has a pair of integral front and rear lugs 19 and 20 respectively. These are for the purpose of spacing the shroud from the deck to provide the deck-shroud marginal opening 15". At its front end the shroud is hinged on the deck by a generally U-shaped bracket 21, a pair of integral shroud lugs 22, and a pivot pin 23 going through the bracket 21 and lugs 22. In FIG. 6 the solid line showing of the shroud 15 is its closed position and the dotted line showing is its hinged open position. In this latter position the front edge of the shroud strikes a portion 21' of the bracket to hold the shroud in 90° plus tilted open position, which is also shown in dotted lines in FIG. 3.

Referring to FIGS. 2 and 4, it will be seen that the engine 14 exhausts to below the mower deck 10. More particularly, a right angle engine exhaust pipe 24 extends from the engine through an opening 24' in the deck to below the deck 10, and the engine muffler 25 is on the outer terminal end of the pipe 24 below the deck.

The invention is particularly advantageous when the power means for the mower is a gas engine, as shown. That is to say, the combustion products and the engine noise are exhausted to below the deck for noise reduction in addition to that provided by the muffler 25 itself. Of course, with an electric motor powering the mower, the mower parts 24, 25 would not be necessary. However, the shroud 15 by itself would still contribute to noise reduction, and would have vents comparable to openings 15' and 15" for purposes of helping to cool the motor. In the illustrated embodiment the top opening 15', besides affording access to the engine start pull cord handle 17, is made large enough to afford full communication to the top engine air intake 14' (see FIG. 2) with the ambient or outside air.

We claim:

1. In a rotary mower having a deck, a grass catching blade below the deck, and power means on the deck for driving the blade, noise reduction means for said mower, said noise reduction means comprising a shroud over said power means, said shroud enclosing said power means except for a top air opening in the same and a marginal air opening about the same between the shroud and deck, said shroud being hinged at one end thereof on said deck, and latch means on said deck at the other end of said shroud to latch the same closed with respect to said power means, said power means comprising a gas engine, said top air opening being formed in said shroud opposite the air intake of said engine, said engine having an engine start pull cord handle, said handle being accessible through said top opening, and said engine having a below deck engine exhaust, said engine exhaust comprising an engine exhaust pipe, said pipe extending from said engine to below said deck, and an engine muffler on the outer terminal end of said pipe below said deck.

* * * * *